United States Patent
Månsson

(10) Patent No.: US 6,753,058 B2
(45) Date of Patent: Jun. 22, 2004

(54) PILE OF HYGIENE- OR WIPING MATERIAL

(75) Inventor: Anna Månsson, Molndal (SE)

(73) Assignee: SCA Hygiene Products AB, Gothenburg (SE)

( * ) Notice: Subject to any disclaimer, the term of this patent is extended or adjusted under 35 U.S.C. 154(b) by 0 days.

(21) Appl. No.: 10/277,146

(22) Filed: Oct. 22, 2002

(65) Prior Publication Data

US 2003/0091786 A1 May 15, 2003

Related U.S. Application Data

(60) Provisional application No. 60/330,474, filed on Oct. 23, 2001.

(51) Int. Cl.$^7$ .................................................. B32B 3/10
(52) U.S. Cl. ............................ 428/43; 428/126; 221/48
(58) Field of Search ................... 428/43, 126; 206/494; 221/48

(56) References Cited

U.S. PATENT DOCUMENTS

| 4,252,279 A | | 2/1981 | Johansson et al. |
| 4,725,469 A | * | 2/1988 | Summerfield ................ 428/43 |
| 5,332,118 A | | 7/1994 | Muckenfuhs |
| 5,540,332 A | | 7/1996 | Kopacz et al. |
| 5,964,351 A | * | 10/1999 | Zander ........................ 206/494 |
| 6,299,016 B1 | * | 10/2001 | Bando et al. .................. 221/33 |

FOREIGN PATENT DOCUMENTS

| EP | 1 167 232 A1 | 1/2002 |
| SE | 435 531 | 10/1984 |
| WO | 00/57843 | 10/2000 |

* cited by examiner

*Primary Examiner*—Alexander S. Thomas
(74) *Attorney, Agent, or Firm*—Young & Thompson

(57) ABSTRACT

A pile of a plurality of panels includes at least one web of a hygiene- or wiping material. The web has a web width and a web length and is divided in its length direction in closely adjacent or partly overlapping separate or partly interconnected sheets, which in the longitudinal direction of the web extend between transverse separations or perforations. The web as well as the sheets are folded in accordion-like manner about transverse folding lines forming panel edges, so that panels are formed and piled on top of each other. The pile has a panel width constituting the distance between adjacent folding lines and a panel length which is the same as the panel width. The majority of the sheets comprised in a pile have a length, which is not divisible with the panel width.

19 Claims, 4 Drawing Sheets

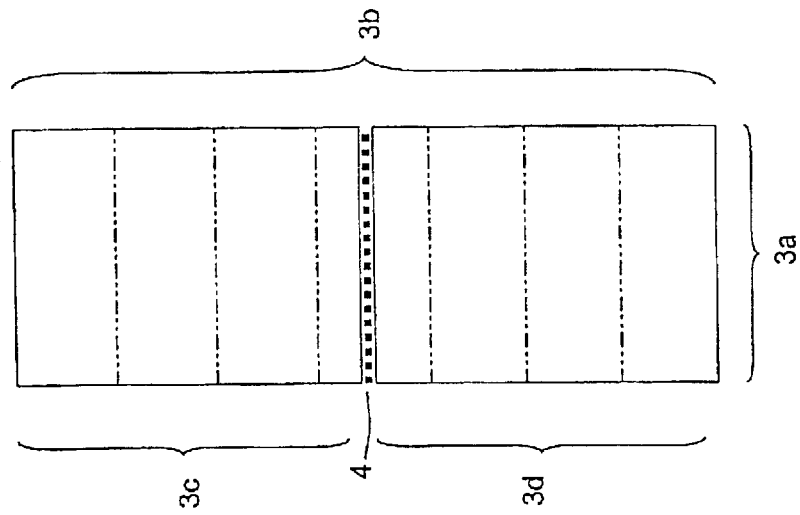
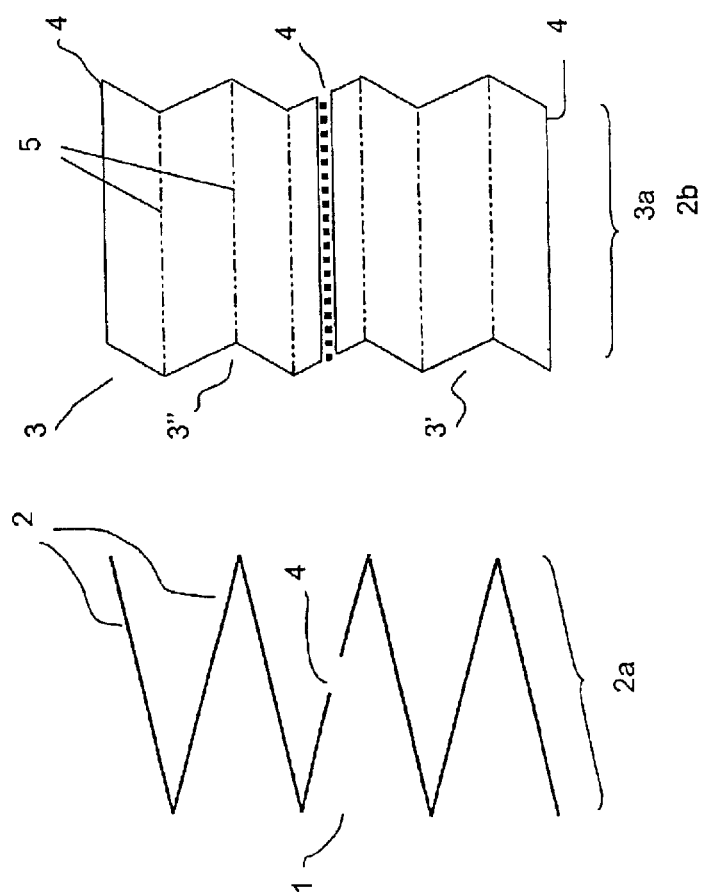

3,5 paneler 3,2 paneler

3¹/₃ paneler

PILE OF HYGIENE- OR WIPING MATERIAL

This application claims the benefit of Provisional Application No. 60/330,474 filed Oct. 23, 2001.

TECHNICAL FIELD

The present invention refers to a pile of a plurality of panels comprising at least one web of a hygiene- or wiping material such as a paper web, preferably a tissue paper web or a nonwoven web, having a web width and a web length. The web is divided in its length direction in closely adjacent or partly overlapping separate or partly interconnected sheets, which in the longitudinal direction of the web extend between transverse separations or perforations. The web as well as the sheets are folded in accordion-like manner about transverse folding lines forming panel edges, so that panels are formed and piled on top of each other. The staple has a panel width constituting the distance between the folding lines and a panel length, which is the same as the web width.

BACKGROUND OF THE INVENTION

Towels, napkins and similar products for personal use and household use are used for many different purposes in industry for cleaning and machine wiping, in washing stations, in toilets in offices and public premises. The products are made from a web of a hygiene- or wiping material, said web having a width and a length and the web is in length direction divided into sheets, i.e. separate products. Each separate product or sheet has a web length, which is folded in accordion-type style so that panels are formed between adjacent folds. The distance between two adjacent folds in longitudinal direction constitutes the panel width. The panel length is the same as the panel width of the product. The products that are folded in panels are then often stored as more or less separate products placed as a sheaf and thus form a pile of panels. The web length for a single product traditionally corresponds to integer multiples of the web width, usually three or four panel widths. Different products can consist of a number of different qualities and constitute different hygiene- or wiping material, such as paper and tissue. Synthetic materials, natural materials and nonwoven and mixtures thereof may of course be used. The products may have different uses and can among other things be used for hygiene, wiping, adsorption, absorption, cleaning and polishing. Among some of the products that can be mentioned are paper towels, towels, different types of cloths, facial tissue, cosmetic tissue, napkins, kitchen towels, toilet paper, washing cloths etc.

Such a pile of paper products is normally stored in a dispenser especially adapted for this purpose, for example a dispenser for consumer use. These dispensers are often found in toilets, offices, hospitals, restaurants, clinics, public buildings, in shops, workshops, garages, in working places, in public or semipublic premises etc., where the products are available for employees, the public, customers and clients. They may for example be placed on the wall, posts or the like. They are often free of charge for the user of the products and these types of products are often frequently and not especially sparingly used. Studies about how the products may be used more effectively than today in order to reach saving goals that have been set up concerning both environment and economy are therefore interesting, see for WO 98/47419. WO 98/47419 discloses different results concerning efficiency at hand wiping especially with respect to total area and basis weight. Further studies of how the products are experienced by the end user together with a plurality of quality demands can also be considered when designing the different products. Thus it is important to be able to optimize the size, shape and basis weight of the products in order to reduce the consumption at every occasion of use both from economical and for environmental reasons. Besides other parameters, size, shape, appearance and bass weight play an important role for offering a good product quality well adapted for the purpose and for making the products to be well experienced by the consumer.

One problem is that the size of the dispensers limit the size, shape and look of the products. The basis weight is indirectly limited as it normally is dependant on the size and shape of the product. A dispenser normally seen has a length, a width and a height. In this case the length of the dispenser corresponds to the maximum panel length, which is equal to the web width of the product, the width and height of the dispenser correspond to the possible panel width and possible height of the pile respectively. One problem with the conventional dispensers are that they of they are adapted to a special product with a certain design and shape. Every product has a limited number of possible lengths, which in turn are dependant on the panel width. The selection of dispensers is often limited and normally seen they are only found in a few fixed sizes, which thus limits the size and design of the products. Finally the choice of the products that can be placed in the dispenser is limited. It is difficult to change product assortment and to change the shape and size of the products with today's dispensers and the products belonging thereto and the method used for making these products.

Starting form the available dispensers one thus has different fixed dispenser widths corresponding to a certain number of panel widths. With a length of the products consisting of integers of the panel width, which usually is for example 3 or 4 panel widths, certain fixed products lengths with a relatively large gap there between are obtained. One of the problems is that there is an undesired large gap between the different fixed product lengths, which makes it necessary to replace the already existing dispensers when a more varying assortment of products are required or desired. There is of course a plurality of different parameters to consider, such as for example efficiency aspects, optimizations, degree of utilization, quality, function of the product, shape, design, stiffness of the web, basis weight etc. Further aspects and parameters that have to be considered will be evident below.

It is important to be able to change assortment, design, shape and function of the products in a relatively simple way in order to be able to keep up with technical development and fulfill efficiency, cost and environmental goals and to meet the increasing demands that exist concerning flexibility and renewal for different consumer groups. In order to make this possible today new dispensers are thud needed. A change of product assortment today thus not only involves a change of products but also a considerably more expensive and extensive change of dispensers.

One of the problems today is that one does not want to change the existing well functioning dispensers that already exist at the user site. Besides one wants to be able to continue using the dispensers that may exist in storages etc. A change of dispensers when changing products assortment is not desirable and involves both a more complicated and expensive handling, which in turn results in that new products are not launched on the market.

SUMMARY OF THE INVENTION

The object of the present invention is to remedy the above-mentioned problems and to provide a method for a more flexible system with increased possibilities to vary the product assortment and at the same time be able to keep the existing dispensers. The invention also aims at providing hygiene and wiping products that can be designed in a both economical and environmentally friendly way and so that qualities and appearance of the products can be chosen irrespective of the available dispensers and the panel sizes that are required. The need for new dispensers can thus be reduced when a new product assortment is produced in order to create improvements, optimizations, efficiency, cost savings, higher degree of utilization, better qualities, higher user benefit and satisfaction as well as variety and renewal.

This is according to the invention solved by the fact that the pile comprises a plurality of panels consisting of at least one web of hygiene or wiping material. The web has a web width and a web length and is in length direction divided in closely adjacent or partly overlapping separate or partly connected sheets/products which in the length direction of the web extend between transverse separations or perforations. The web as well as the sheets are folded in accordion like manner about transverse folding lines forming panel edges, so that panels are formed and piled on top of each other. The staple has a panel width constituting the distance between the folding lines and a panel length which is the same as the web width, wherein the plurality of sheets in a pile have a length which is not divisible with the panel width and thus is not an integer of the panel width. The term "the plurality of sheets in a pile" refers to at least the half number of the sheets and preferably all sheets possibly except for the first or two first and the last or the two last sheets in a pile, which sometimes may have another length than the rest of the sheets.

A great advantage is that in this way it is possible to use different folding for the same length of hygiene and wiping products, i.e. the length of the sheets. Besides the same folding may be used for a plurality of different sheet lengths.

The invention further meets desires concerning either a separate web with separately, closely adjacent located or partly overlapping sheets, or partly interconnected sheets, or the invention refers to at least two interfolded webs, wherein each web is divided in separately, closely adjacent located or partly overlapping sheets, or partly interconnected sheets. In the latter case—at least two interfolded webs—the sheets of the respective web are overlapping each other. The separations or perforations between two sheets of one web is by that displaced in relation to the separation or perforation between two sheets of the adjacent web.

The invention aims at creating flexibility an enabling having hygiene and wiping materials of an optional web length. The length of the product/sheet can according to the invention be varied in a stepless manner and is thus independent of the panel width. The length of the sheets can also be chosen so that the sheets will have a substantially square shape. This is especially advantageous since it has been established that a substantial square shape is a very effective shape. This shape has previously with existing methods and dispensers with products placed in piles and with respect to other parameters such as for example basis weight, panel width and panel length been a shape that has been difficult to obtain.

Thus one object of the invention is to make it possible to freely place the position of the sheets over the panel width in the pile. By this at least one perforation or separation between two sheets can be placed at and/or between the edges of the panels.

According to the traditional manner the separations or perforations are placed at the edges of the panels. The thickness of the products is less at the separations of perforations, which means that the pile will not have the shape of a straight block but is curved downwards at the edges so that an oblique and, as seen from the outside, "egg-shaped" pile is obtained. In order to have an even, horizontal, straight-shaped and easy to handle pile of wiping products the separations or perforations are arranged so that they will be evenly distributed over the panel width in the pile. Distributing the separations or perforations over the panel width can have several advantages.

BRIEF DESCRIPTION OF THE DRAWINGS

The invention will in the following be described more in detail referring to the embodiments shown in the drawings.

FIG. 1 shows in a side view a pile according to the invention of a plurality of panels with two sheet lengths.

FIG. 2 shows another view of the same pile as in FIG. 1.

FIG. 3 shows the same pile as in FIGS. 1 and 2 in elongated shape.

DETAILED DESCRIPTION OF THE INVENTION

Figure 5:
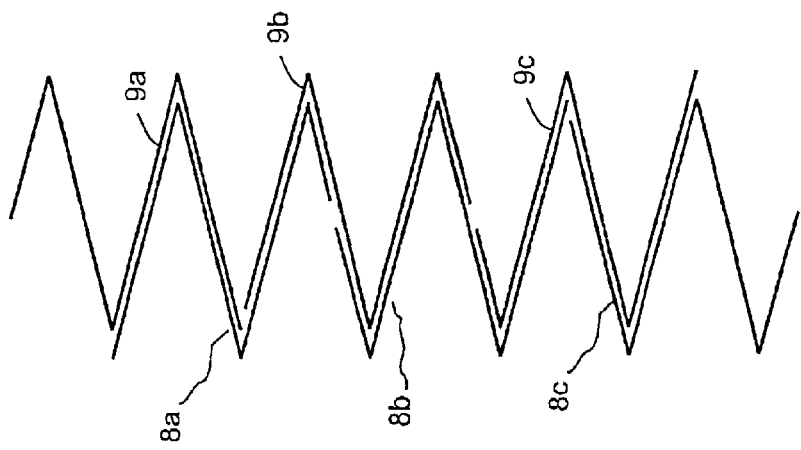
FIG. 5 shows a pile of a plurality of panels according to the invention, wherein the lengths of the sheets is not divisible with the width of the panel.

In FIGS. 1–3 a pile 1 is shown, said pile being composed of a plurality of sheets 3', 3" consisting of a plurality of panels 2 which in turn consist of a folded web 3 of a hygiene or wiping material such as a paper web, a nonwoven web or the like. The web 3 can either be used in simple form, at which the pile consists of one and the same web, or the web can be used in an alternating folded shape with at least one further web, i.e. at least two interfolded webs. The web 3 is folded at a number of folding lines 5 substantially perpendicularly to the length extension of the web 3 so that panels 2 are formed. The panel 2 is what is created when folding the web between the folding lines 5 and the panel has a panel width 2a extending between adjacent folding lines 5 and a panel length 2b extending along the folding lines 5. The web 3 has a web width 3a coinciding with or equal to the panel length 2b, and a web length 3b and the web is divided by transverse separations into closely adjacent or partly overlapping separate sheets 3', 3" or perforations 4 with partly interconnected sheets 3', 3" with respective lengths 3c, 3d.

The invention can thus, which is also shown in FIGS. 1–3, also only consist of a single web wherein each sheet 3', 3" follows upon each other in one and the same web 3, or the web 3 can be alternated in folded shape with at least a further web wherein the webs thus are interfolded. The sheets 3', 3" can be separate and thus completely divided from each other in such a way that they are not at all interconnected. By that the separate sheets are located closely together or are partly overlapping each other. One disadvantage with completely disconnected, separate sheets when a single web is used and when the sheets are not partly overlapping each other can be that the next sheet will not automatically follow a certain distance out of the dispenser when the previous sheet/products is withdrawn or fed out there from. If the separate sheets instead of being close together are overlapping each other normally the next sheet/product will follow the previous products out to a certain degree as the previous sheet is withdrawn from the dispenser. The reason why the next sheet/product automatically follows the previous can be several such as for example friction or different types of adhesion. The sheets 3', 3" can also be separated from each other through a perforations or the like, at which the perforation 4 terminates one web portion 3' at the same time as it starts a further sheet 3", also in this case the next sheet will automatically follow.

The term web of a hygiene or wiping material as used herein includes according to the invention several different materials and products. It may be hygiene- or wiping materials intended for many different purposes in industry for cleaning and machine wiping, in washing stations, in toilets in offices and in public premises. It can be intended for personal use and household use, such as paper towels, cloths, wipes, handkerchiefs, napkins, wet napkins, toilet paper, kitchen paper, facial tissue, cosmetic tissue, baby wipes, washing cloths, bathing cloths, kitchen towels, kitchen wipes and cleaning wipes. Further different types of products, especially adapted for commercial and industrial use such as for example cloths, wipes and tissue for polishing, oil wiping, spillage wipes and other wipes for industrial cleaning and the like, for example for use in workshops or printing offices. It may also be both dry and wet towels, wipes and pretreated tissue. The hygiene-, cleaning and wiping material can be treated at the production or after treated with for example liquids, suspensions, lotions, different chemicals, agents therapeutic agents or the like. Further paper, reinforced tissue, nonwoven material and synthetic material and mixtures thereof. Other hygiene- or wiping products that may be included, be close to or closely related to said products or field of use are of course also intended to be included in the definition of a web of hygiene- or wiping material according to the invention.

When pulp fibers are used it is assumed that pulp fibers of all different types normally included in soft paper manufacturing can be used in this invention. Also other pulp of cellulose fibers can be used. Some examples are the fibre hairs from cotton linters, bast cells such as ramie, linen and jute, straw pulp, bamboo pulp, bagasse, hamp or nylon. Chemical wood pulp, which can be used, is for example sulphite, sulphate or organosolve pulp. Mechanical wood pulp, which can be used, can be ground pulp, thermo mechanical pulp, refiner pulp and also chemi mechanical pulp. The pulp may be made of fibres from softwood as well as from hardwood. Another important raw material is waste pulp from reject and waste paper. Moreover synthetic and semi synthetic fibres and mixtures thereof can be used. Nonwoven materials are according to the invention one of several preferred choices of materials.

What all the different products according to the invention mainly have in common is that they are stored in a dispenser and are withdrawn or fed out when used. Dispensers may look and be used in different ways. Dispensers may consist of a number of different boxes, containers, spaces etc. The dispenser can also be the same as the cardboard box or plastic package in which the products are delivered or placed in, or it may consist of different containers and supports. The dispenser can also be provided with suspension means so that it may be hung up on a wall, post or the like. Alternatively it can be intended to be placed on a horizontal surface, such as a bench, a table, a roof or a floor. The dispenser may also be intended to be carried along. The wipes can, one after the other be withdrawn from the dispenser through an outlet opening. The products are adapted to existing dispensers and dispenser sizes. New panel sizes traditionally means that existing dispensers have to be replaced.

Figure 4:
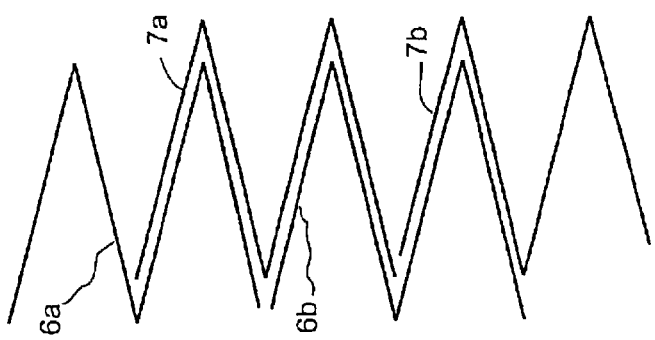
FIG. 4 shows prior art of a pile of a plurality of panels with two alternating interfolded webs divided into sheets.

One traditional way of storing hygiene- or wiping material is thus in dispensers, from where one product after the other can be taken out or fed out. The hygiene- or wiping material is normally provided as sheets of a certain length, which then is folded along the transverse direction of the web in an accordion-like manner so that every other fold is in the same direction. Panels are thus formed and piled on top of each other. FIG. 4 shows prior art with two interfolded webs where the sheets 6a–b are alternated with the sheets 7a–b. The sheets are folded in a traditional manner in panels that are piled on top of each other. Every sheet consists of panels of whole panel lengths, which is the manner used today and the panels may have different sizes depending on which dispenser the product is intended for. There are for example three panel sizes used, at which the panel width, i.e. the distance between the folds, is 85, 107 or 115 mm. These panel widths are dependant on the available dispensers and the panel width thus fits these dispensers. The length of the product or the sheet is thus traditionally locked to be dependant on an integer multiple of the panel width. For the above mentioned product with the panel width 85 mm this results in the sheet/product lengths 170, 255, 340 for 2, 3, 4 panels respectively. For the product with a panel width of 107 mm one gets 2–4 panels and the product lengths 214, 321 and 428 mm. Finally for the panel width 115 mm the corresponding values for the product length are 230, 345 and 460 mm. By this it is seen that for the shortest panel width, 85 mm, there is a large gap between for example the product lengths 255 mm and 340 mm when 3 respectively 4 panels are used. Likewise the size gap in length for example for the product having a panel width 107 mm, between 214 mm and 321 mm is too large. Several differences in length, which may be too large, exist for the above-mentioned existing sheet/product lengths. Also more panel widths, multiples of these panel widths, which result in different products lengths depending on the number of panels, besides the panel widths already mentioned, may also be encompassed by the same problem. The basis weight may vary from 15 g/m$^2$ per ply, which for a two-ply product gives a total basis weight of 30 g/m$^2$. It is also very interesting to use 20 g/m$^2$ in two plies, which gives 40 g/m$^2$ in total weight. The basis weight 35 g/m$^2$ is also interesting, but of course all basis weights used or would be possible to use are also most interesting.

In order to have a hygiene- or wiping product that is better for the consumer it is important that the product has the right shape at the same time as other aspects must be considered. When for example hands are to be wiped a certain size is also required. But the requirement for a certain size also exists for products of other previously mentioned fields of use and therefore not only includes wiping of hands, face or the like. The web width is normally seen determined by the size of the dispensers and here factors like the stiffness of the web and the width of the papermaking machine play a role. This involves that the web width as well as the panel length is relatively locked to different parameters. In certain aspects it is not desirable to create more rectangular products since it has proved that an active use often occurs in the centre of the hygiene- or wiping product, at which an essentially square shape of the product/sheet can be desired.

The number of panels determines the length of the product but the number of panels, and by this indirectly the product length, controls and determines which basis weights that are reasonable to use. This depends on different factors, some of which can be mentioned be cost goals, consumer experience, product quality, production etc. It has for example been discovered that when comparing two different products of having the same amount of fibres the product having 3 panels and a basis weight of 28 g/m² per ply, i.e. a product basis weight of 56 g/m², was experienced clearly better than a product having 4 panels and a basis weight of 21 g/m² per ply, i.e. a product basis weight of 42 g/m². This can lead to a conclusion indicating that smaller products having a somewhat higher or higher basis weight are better. Besides the production speed can be improved with a higher basis weight, since a product of a higher basis weight generally seen is easier to produce. Moreover more products care provided in length direction and totally seen a product having fewer panels and a higher basis weight leads to that the products can be produced in a productivity- and cost efficient way.

One of the main problems with today's technique thus is that with a different number of panels and fixed dispenser sizes one cannot produce all desired product sizes in order to be able to optimize the product. Besides, since available dispensers lock the panel width, the desired basis weight cannot be freely chosen. The fact that product length, panel width and basis weight can not be chosen freely without replacing existing dispensers is a big problem and results in that the products can not be optimized freely.

FIG. 5 shows a preferred embodiment according to the invention, in which a system has been created which is not based on integer multiples of the panel width, in order to provide the desired result. Folded products of an optional length are then possible to make. In this embodiment half panels are used in the pile. The sheets 8a–c are interfolded with the sheets 9a–c. The number of panels in FIG. 5 is 3.5 but it would of course be possible to be any integer and a half panel, such as for example 1.5, 2.5 or 4.5 panels.

Figure 7:
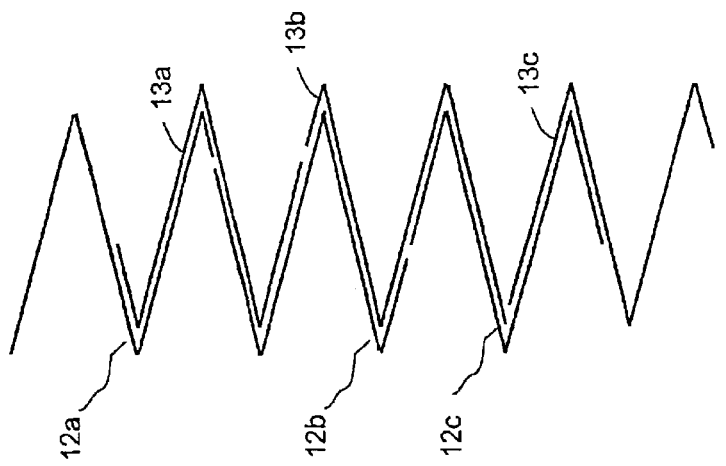
FIG. 7 shows further possible embodiments of a pile according to the invention.
Figure 6:
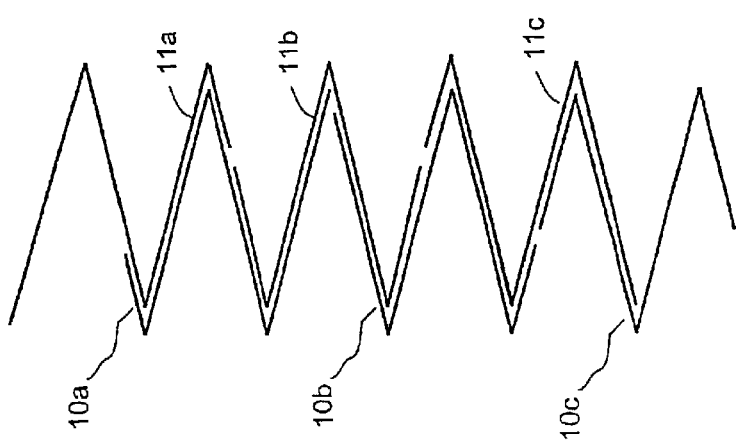
FIG. 6 shows a further embodiment of a pile of a plurality of panels according to the invention, wherein the lengths of the sheets is not divisible with the width of the panel.
Figure 10:
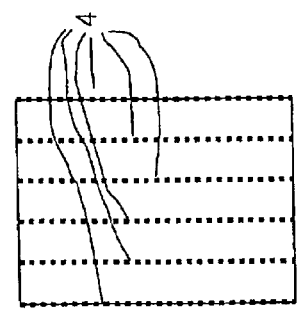
FIGS. 8–10 show in a view from above a pile of a plurality of perforations or separations that are hidden in the pile, wherein the perforations or separations have different locations over the panel width in the pile

FIG. 6 shows one of several preferred embodiments with 3⅓ panels and two webs 10, 11 which are interfolded with the sheets 10a–c, 11a–c with separations or perforations between each sheet. A view from above of a pile according to FIG. 6 where the separations or perforations are shown as hidden lines in the pile are shown in FIG. 10. FIG. 7 shows the sheets 12a–c, 13a–c which consist of 3.2 panels.

The invention involves that the product length can be varied in a stepless manner and by that all imaginable variants of non-integer multiples of the panel width can be used, i.e. not only integers but all real numbers, especially lengths that are not divisible with the panel width. By this the relationship between size and basis weight can be varied in a manner which is not possible with previous technique without changing the panel size. The invention will mainly be of an advantage for sheets being longer than especially two panel widths.

The manufacturing of sheets from a web of material according to the invention, i e the creation or perforations or separations, can be made with different techniques, wherein no known technique is excluded to be used in this invention. Water jets, air jets, mechanical or thermal means can be used for providing the desired perforations or separation. Knives, needles, sharp objects or the like as well as other methods may be used for perforation or creating separations between the sheets. One way of creating perforations is shown in EP 0 287 766 where a rotating cutter has knives which provide perforations.

The same publication also gives an example of a manufacturing method for piles of folded webs without loosely hanging ends, at which one web gets an additional perforation placed near the ordinary perforation in the other web when a pile is to be separated from another pile.

Figure 8:
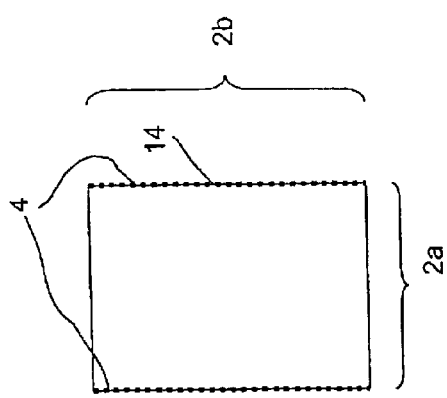
Figure 9:
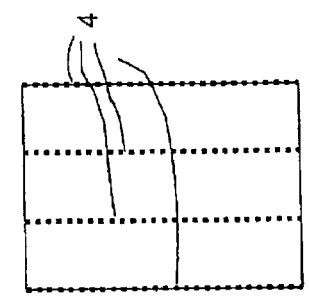

Something that is also a problem with today's manufacturing of piles is that the bundles easily get so to say "egg-shaped" due to that separations or perforations are present at the edges so that the pile gets somewhat thinner and lower there. This means that the pile 1 is somewhat collapsed at the edges 14 since the separations or perforations 4 traditionally are located at the edges 14 of the panel. FIGS. 8–10 show a pile seen from above where separations or perforations 4 shown are hidden in the pile. The separations or perforations make the material of the web displaced somewhat aside or compressed besides that the web material is partly or completely missing at the separation or perforation. The area at or close to the separations or perforations thus do not have the same thickness as the rest of the web and by that the pile will collapse to some degree at the area of the separations or perforations. In case all perforations or separations 4 or located immediately on top of each other at the same place in the pile this effect will be accumulated and the bundles will be so to say "egg-shaped" and somewhat more difficult to handle.

When the piles are made in a preferred embodiment of the present invention this problem is overcome by using an arbitrary number of fractions so that the perforation or separation 4 always ends up in a new position on the panel width in the pile. The invention is not limited to even fractions but all real numbers of panels can be used, but it is not possible to mention all numbers that may be used. They can be chosen so that they will be evenly distributed over the panel width 2a in the pile. FIGS. 9–10 show some examples of non-integer multiples of the panel width 2a, which is not divisible with the panel width, wherein third part panels and fifth part panels are used. The invention is in no way limited to only comprise these numbers but also comprise all possible variants of non-integer multiples or non-integer numbers of the panel width 2a, i e all numbers that are not divisible with the panel width. Any practical and suitable number can be used. Also integers may be used when the position in the pile of the perforations or separations are displaced from the normal position at the panel edge 14 or alternatively are displaced from another normal position, such as in the middle of the panel width. When non-integer multiples of the panel width are suitably chosen the perforations or separations will gradually be evenly distributed over the panel width 2a.

A preferred embodiment according to the invention for choosing the where in the pile the separations or perforations are to be placed is to organize the overlap between two webs so that the separations or perforations for web 1 is placed halfway between the separations or perforations of web 2, etc. One way is to avoid placing the next separation or perforation in a web 1 immediately above the previous separation or perforation in web 1. This means that two consecutive separations or perforations 4 are placed so that the placing in the pile of a separation or perforation of web is not immediately above and not vertically aligned with the previous or next separation or perforation in the same web.

According to a further preferred embodiment of the invention non-integer multiples or numbers can be chosen so that every separation or perforation will be located in a unique position in the transverse direction, i e across the panel width. Then a separation or perforation will not be located vertically straight above another separation or perforation in the pile. The placing of a separation or perforation of a web in the pile is thus not straight above and not vertically aligned with any other separation or perforation in the pile. This can apply irrespective of whether they are separations or perforations in one web, two webs or further webs which are not substantially vertically aligned with any other separation or perforation. This is a method, which gives optimal bundles at least concerning the shape of the pile.

The same product length and sheet length can thus have different folding as well as that the same folding can be used for different sheet lengths. This makes the manufacture, optimization, consumer need, production efficiency, economy, environmental concern as well as usefulness are improved and that a replacement of existing dispensers is avoided.

All the possible variations and variants of the described products are included in the invention according to the method disclosed in the claims and closer described in the description. The invention should thus not be considered to be restricted to the above embodiments or descriptions since these are only intended to explain the invention.

What is claimed is:

1. A pile of a plurality of panels comprising at least one web of a hygiene- or wiping material, wherein the web has a web width and a web length and is divided in its length direction in closely adjacent or partly overlapping separate or partly interconnected sheets which in the longitudinal direction of the web extend between transverse separations or perforations, the web as well as the sheets being folded in accordion-like manner about transverse folding lines forming panel edges, so that panels are formed and piled on top of each other, wherein the pile has a panel width constituting the distance between adjacent folding lines and a panel length which is the same as the web width, and the majority of the sheets comprised in a pile have a length which is not divisible by an integer of the panel width and wherein, throughout said majority of sheets, no two consecutive perforations or separations of the same web are overlapping.

2. Pile as claimed in claim 1, wherein each pile comprises at least two interfolded webs, where the respective web is divided in separate or partly interconnected sheets.

3. Pile as claimed in claim 2, wherein the separation or perforation between two sheets of one web is displaced with respect to the separation or perforation between two sheets of the adjacent web.

4. Pile as claimed in claim 3, wherein the separation or perforation of at least one web is placed so that it will be located substantially in the middle between two separations or perforations of the other web.

5. Pile as claimed in claim 1, wherein at least one separation or perforation between two sheets is placed at the edges of the panels in the pile.

6. Pile as claimed in claim 1, wherein the majority of the separations or perforations between two sheets are placed between the edges of the panels.

7. Pile as claimed in claim 1, wherein the separations or perforations in the pile are substantially evenly distributed over the panel width.

8. Pile as claimed in claim 1, wherein the length of the majority of sheets is chosen with respect to the web width/panel length so that the respective sheet gets a substantially square shape.

9. Pile as claimed in claim 1, wherein the panel width is chosen to be about equal to or less than 115 mm and the basis weight of the product is greater than or substantially equal to 30 g/m$^2$.

10. Pile as claimed in claim 1, wherein the panel width is chosen to be substantially equal to or less than 107 mm and the basis weight of the product is substantially between 30 and 60 g/m$^2$.

11. Pile as claimed in claim 10, wherein the basis weight of the product is greater than or substantially equal to 35 g/m$^2$.

12. Pile as claimed in claim 10, wherein the basis weight of the product is greater than or substantially equal to 40 g/m$^2$.

13. Pile as claimed in claim 10, wherein the basis weight of the product is greater than or substantially equal to 56 g/m$^2$.

14. Pile as claimed in claim 1, wherein the separations or perforations of a web in the pile is not straight above and thus not vertically aligned with any other separation or perforation in the pile.

15. A pile comprising at least one continuous web, wherein the web has a web width and a web length and is divided in a longitudinal direction into partly interconnected sheets which in the longitudinal direction of the web extend between transverse perforations, such that the web as well as the sheets are folded in accordion-like manner about transverse folding lines forming panel edges, so that a plurality of panels are formed and piled on top of each other, wherein the pile has a panel width constituting the distance between adjacent folding lines and a panel length which is the same as a web width, and wherein the sheets have a length such that when folded, at least two of the plural panels have a different width so that no two consecutive sheets have a same panel configuration.

16. The pile as claimed in claim 15, wherein two consecutive perforations of the same web are not vertically aligned with each other.

17. The pile as claimed in claim 15, wherein there are 3.2 panels per sheet.

18. The pile as claimed in claim 15, wherein there are 3 ⅓ panels per sheet.

19. The pile as claimed in claim 15, wherein each sheet is substantially square shape.

* * * * *

UNITED STATES PATENT AND TRADEMARK OFFICE
CERTIFICATE OF CORRECTION

PATENT NO.    : 6,753,058 B2  Page 1 of 1
DATED         : June 22, 2004
INVENTOR(S)   : Anna Månsson It is certified that error appears in the above-identified patent and that said Letters Patent is hereby corrected as shown below:

Title page,
Items [12] and [75], change "Mänsson" to -- Månsson --.

Signed and Sealed this

Twenty-third Day of November, 2004

JON W. DUDAS
*Director of the United States Patent and Trademark Office*